(12) United States Patent
Hashimoto

(10) Patent No.: US 7,438,100 B2
(45) Date of Patent: Oct. 21, 2008

(54) PNEUMATIC TIRE FOR ICE-BOUND OR SNOW-COVERED ROAD

(75) Inventor: Yoshimasa Hashimoto, Hiratsuka (JP)

(73) Assignee: They Yokohama Rubber Co., Ltd., Tokyo (JP)

( * ) Notice: Subject to any disclaimer, the term of this patent is extended or adjusted under 35 U.S.C. 154(b) by 73 days.

(21) Appl. No.: 10/513,223

(22) PCT Filed: Jun. 25, 2003

(86) PCT No.: PCT/JP03/08017

§ 371 (c)(1),
(2), (4) Date: Nov. 3, 2004

(87) PCT Pub. No.: WO2004/005051

PCT Pub. Date: Jan. 15, 2004

(65) Prior Publication Data

US 2005/0167022 A1 Aug. 4, 2005

(30) Foreign Application Priority Data

Jul. 5, 2002 (JP) .............................. 2002-197611
Jul. 5, 2002 (JP) .............................. 2002-197618

(51) Int. Cl.
*B60C 11/11* (2006.01)
*B60C 11/12* (2006.01)

(52) U.S. Cl. ............................. 152/209.15; 152/209.18; 152/DIG. 3; 152/902

(58) Field of Classification Search ............ 152/209.15, 152/209.18, DIG. 3, 902
See application file for complete search history.

(56) References Cited

U.S. PATENT DOCUMENTS 5,176,765 A * 1/1993 Yamaguchi et al. .... 152/DIG. 3
2002/0144762 A1 * 10/2002 Peda et al. ............... 152/209.8

FOREIGN PATENT DOCUMENTS

| EP | 0968849 A2 | 1/2000 |
| JP | 64-022601 A1 | 1/1989 |
| JP | 03-038406 A1 | 2/1991 |
| JP | 04-310408 A1 | 11/1992 |

(Continued)

OTHER PUBLICATIONS

International Search Report for PCT/JP03/08017 mailed on Sep. 16, 2003.

*Primary Examiner*—Steven D Maki
(74) *Attorney, Agent, or Firm*—Greer, Burns & Crain, Ltd.

(57) ABSTRACT

A pneumatic tire for ice-bound or snow-covered roads, which has fine grooves formed in a tread surface, thereby improving brake and drive performance on ice-bound roads in early periods of wear. This pneumatic tire for ice-bound or snow-covered roads has its tread partitioned into a plurality of lands, these lands being formed with sipes, wherein the tread surface at the lands is formed with a plurality of fine grooves shallower than the sipes, the edges of these fine grooves being curved. Further, the width of the openings of the fine grooves is larger than the width of the bottoms thereof. Further, the angle of the fine grooves with the circumferential direction of the tire is 42 to 60 degrees.

5 Claims, 5 Drawing Sheets

FOREIGN PATENT DOCUMENTS

| | | | |
|---|---|---|---|
| JP | 7-186633 | * | 7/1995 |
| JP | 07-186633 A1 | | 7/1995 |
| JP | 07-195573 A1 | | 8/1995 |
| JP | 7-257111 | * | 10/1995 |
| JP | 8-332810 | * | 12/1996 |
| JP | 9-323511 | * | 12/1997 |
| JP | 3017677 B2 | | 12/1999 |
| JP | 2000-211321 A1 | | 8/2000 |
| JP | 2001-191741 | | 7/2001 |
| JP | 2002-067621 | * | 3/2002 |
| WO | WO-01/08906 A1 | | 2/2001 |

* cited by examiner

PNEUMATIC TIRE FOR ICE-BOUND OR SNOW-COVERED ROAD

FIELD OF THE INVENTION

The invention relates to a pneumatic tire suitable for ice-bound or snow-covered roads, and more particularly to a pneumatic tire for ice-bound or snow-covered roads, which has fine grooves formed in a tread surface, thereby improving brake and drive performance on ice-bound roads in early periods of wear.

DESCRIPTION OF THE RELATED ART

For example, pneumatic tires for ice-bound or snow-covered roads, typified by studless tires, have a filler or foam mixed in tread rubber so that microscopic asperities develop on a tread surface. The asperities exert the effect of removing a water film on ice-bound roads, and thus contribute to improvement in drive performance on such roads. However, since a tire before a break-in does not sufficiently have the aforementioned asperities on a tread surface thereof, the tire has had a disadvantage in that the tire cannot fully exert its inherent drive performance in early periods of wear.

As one technique for overcoming the disadvantage, for example, Japanese Unexamined Patent Application Publication No. Hei 7(1995)-186633, proposes the provision of fine ribs extending in a circumferential direction of a tire on tread surfaces at lands into which tread of the tire is partitioned. In addition, Japanese Patent No. 3017677 proposes the provision of auxiliary sipings, which have a shallower depth than main sipings and extend in a width direction of a tire, on the tread surface of blocks.

In the tire according to the former technique above, having the fine ribs formed on the tread surface, fine grooves between the fine ribs function to take in snow while removing a water film, thereby ensuring a contact area. However, the tire may have inadequate drainage of snow in the fine grooves, which may cause snow clogging. Similarly, the tire according to the latter approach above, having the auxiliary sipings formed on the tread surface, may have inadequate drainage of snow in the auxiliary sipings, which may cause snow clogging. Thus, these tires have a problem as given below. The occurrence of snow clogging mentioned above leads to a reduction in the amount of snow taken in, thus to a reduction in the contact area, and thus to degradation in brake and drive performance on ice-bound roads, when the fine grooves or the auxiliary sipings come into another contact with a road surface.

The former tire having the fine ribs oriented in the circumferential direction of the tire has the following problems. The edges of the fine ribs do not contribute to braking and driving. Moreover, much time is required before the fine ribs wear away so that the tire exerts properties intrinsic to tread rubber. In the latter tire having the auxiliary sipings oriented in the width direction of the tire, the auxiliary sipings do not extend in the travel direction, and thus the tire has an inadequate effect of removing a water film on ice-bound roads and also has difficulty in removing snow on the tread surface. Thus, the tire has the problem of being incapable of achieving adequate improvement in the brake and drive performance on ice-bound roads in early periods of wear.

In particular, an antilock braking system (ABS) has recently become the mainstream of braking equipment of automobiles. In ABS-based braking, there is a tendency for a braking distance to become longer due to snow on the tread surface. More specifically, in the case of lock braking, snow on the tread surface is melted by frictional heat because the tire slides on its same tread. In the case of the ABS-based braking, snow on the tread surface is less likely to melt because the tire rotates even during braking. Thus, the ABS-based braking has the following problem. When there is snow on the tread surface of the tire, a brake is released without achieving its inherent brake performance, and the repeated releases result in the increased braking distance.

SUMMARY OF THE INVENTION

It is an object of the invention to provide a pneumatic tire for ice-bound or snow-covered roads which has fine grooves formed in a tread surface, thereby improving brake and drive performance on ice-bound roads in early periods of wear, and which prevents snow clogging in the fine grooves, thereby enabling a further enhancement of the effect of improving the brake and drive performance.

It is another object of the invention to provide a pneumatic tire for ice-bound or snow-covered roads which has fine grooves formed in a tread surface, thereby improving brake and drive performance on ice-bound roads in early periods of wear, and which allows the fine grooves to wear away early, thereby enabling early exertion of properties intrinsic to tread rubber.

To achieve the above objects, a pneumatic tire for ice-bound or snow-covered roads of the invention includes tread partitioned into a plurality of lands formed of blocks or ribs, each land having a plurality of sipes formed therein, wherein a plurality of fine grooves shallower than the sipes are formed in a tread surface of the land, and the edges of the fine grooves are formed into a curved shape.

To achieve the above objects, a pneumatic tire for ice-bound or snow-covered roads of the invention includes tread partitioned into a plurality of lands formed of blocks or ribs, each land having a plurality of sipes formed therein, wherein a plurality of fine grooves shallower than the sipes are formed in a tread surface of the land, and the width of an opening of the fine groove is greater than the width of a bottom thereof. Preferably, the edges of the fine grooves are formed into a curved shape.

As described above, the fine grooves formed in the tread surface are used to improve the brake and drive performance on ice-bound roads in early periods of wear. In this case, the edges of the fine grooves are formed into a curved shape so that the opening of the fine groove is substantially wider than the bottom thereof, or the sidewalls of the fine grooves are tilted so that the width of the opening of the fine groove is greater than the width of the bottom thereof. Thus, it becomes easy to take snow in the fine grooves and thus to ensure a sufficient contact area during running on ice-bound roads. Further, it becomes possible to facilitate drainage of snow from the fine grooves and to prevent snow clogging. This enables a further enhancement of the effect of improving the brake and drive performance on ice-bound roads in early periods of wear. In the case where the fine grooves have sharp edges, the edges may take in excessive snow when the tread surface comes into contact with a road surface, and thus the compressed snow may be difficult to eliminate. Nevertheless, the fine grooves having the curved edges as mentioned above can prevent the edges from taking excessive snow.

A pneumatic tire for ice-bound or snow-covered roads of the invention includes tread partitioned into a plurality of lands formed of blocks or ribs, each land having a plurality of sipes formed therein, wherein a plurality of fine grooves shallower than the sipes are formed in a tread surface of the land, and the angle of the fine groove with the circumferential direction of the tire lies between 42 and 60 degrees inclusive.

As described above, a plurality of fine grooves shallower than the sipes are formed in the tread surface of the land, and the angle of the fine groove with the circumferential direction of the tire lies between 42 and 60 degrees inclusive. This configuration allows achieving an adequate effect of the edges of the fine grooves during braking or driving, without impairing the effect of removing a water film developing between an ice-bound road surface and the tread surface and the capability of eliminating snow on the tread surface. Therefore, this enables significant improvement in the brake and drive performance on ice-bound roads in early periods of wear. Moreover, the fine grooves wear away early by frictional force, which is received by the lands during braking, driving or cornering, and this enables early exertion of properties intrinsic to tread rubber. Preferably, the edges of the fine grooves are formed into a curved shape, or the width of an opening of the fine groove is greater than the width of a bottom thereof, in order to improve the capability of eliminating snow on the tread surface.

Preferably, in the invention, the depth of the fine groove is set to lie between 0.1 and 0.8 mm inclusive, the width of the fine groove is set to lie between 0.1 and 0.8 mm inclusive, and the pitch of the fine grooves is set to lie between 0.5 and 2.0 mm inclusive, in order to achieve an adequate effect of improving the brake and drive performance on ice-bound roads.

BEST MODES FOR CARRYING OUT THE INVENTION

The invention will be described in detail below with reference to the accompanying drawings.

Figure 1:
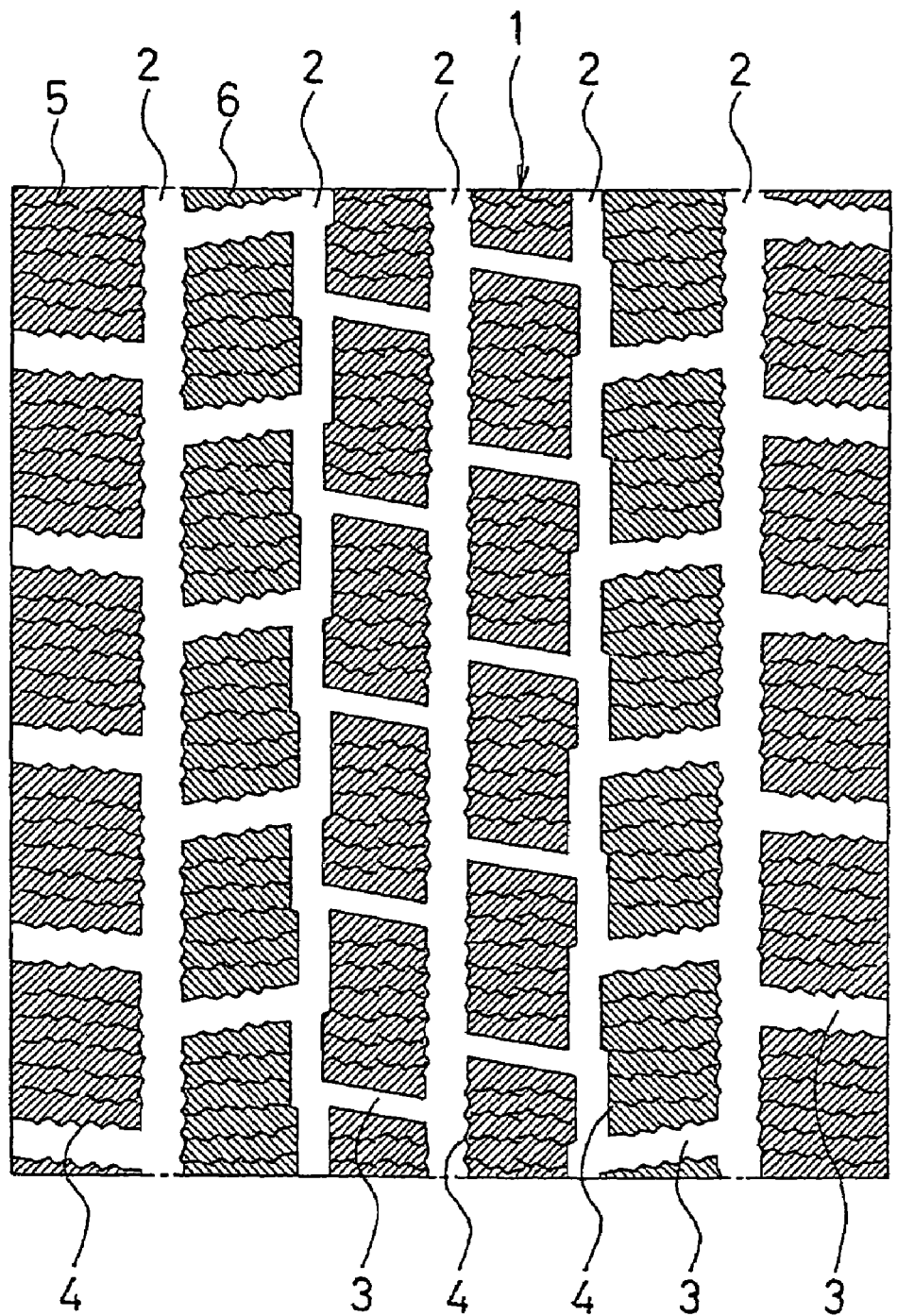
FIG. 1 is an exploded view showing a tread pattern of a pneumatic tire for ice-bound or snow-covered roads according to an embodiment of the invention.
Figure 2:
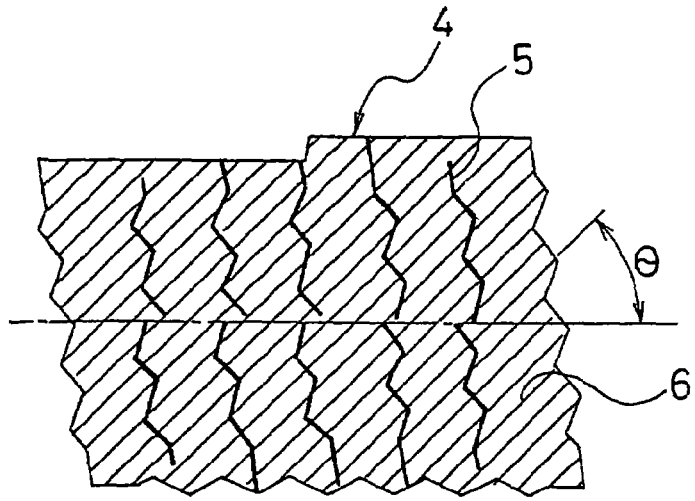
FIG. 2 is an enlarged plan view illustrating a block in the tread pattern shown in FIG. 1.
Figure 3:
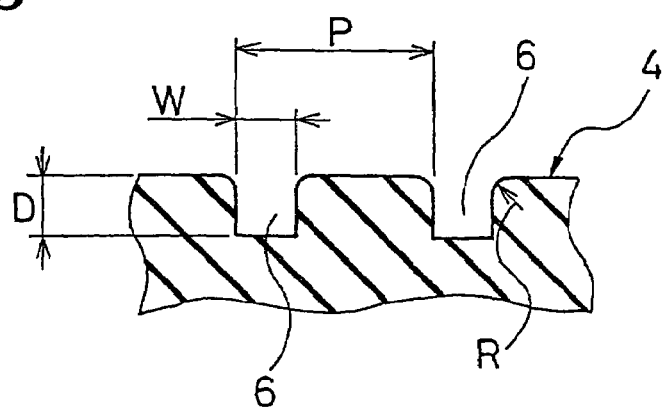
FIG. 3 is a cross-sectional view of the block, showing fine grooves formed in the block shown in FIG. 2.

FIG. 1 shows a tread pattern of a pneumatic tire for ice-bound or snow-covered roads according to an embodiment of the invention. FIG. 2 illustrates an enlarged view of a block in the tread pattern shown in FIG. 1. FIG. 3 illustrates an enlarged view of fine grooves formed in the block shown in FIG. 2.

As shown in FIG. 1, tread 1 is provided with a plurality of main grooves 2 extending in a circumferential direction of a tire, and a plurality of lateral grooves 3 extending in a width direction of the tire. The tread 1 is partitioned into a plurality of lands, which are formed of a plurality of blocks 4, by the main grooves 2 and the lateral grooves 3. Each block 4 has a plurality of sipes 5 formed therein. The composition of rubber constituting the tread 1 has a filler or foam mixed therein so that microscopic asperities having the effect of removing a water film develop on a worn tread surface.

As shown in FIG. 2, a plurality of fine grooves 6 shallower than the sipes 5 are formed in the tread surface of the block 4. The fine grooves 6 extend parallel to one another across the block 4. As shown in FIG. 3, the edges of the fine grooves 6 are formed into a curved shape with a curvature radius R.

In the pneumatic tire for ice-bound or snow-covered roads configured as mentioned above, the edges of the fine grooves 6 are formed into a curved shape. Thus, the fine grooves 6 appropriately take in snow on roads so that the tire ensures a sufficient contact area and the fine grooves 6 effectively eliminate snow therein by centrifugal force taking place during the rotation of the tire. Moreover, the fine grooves 6 effectively remove a water film developing between an ice-bound road surface and the tread surface during running. Therefore, the pneumatic tire can exert excellent brake and drive performance on ice-bound roads in early periods of wear before the fine grooves 6 wear away.

Figure 4:
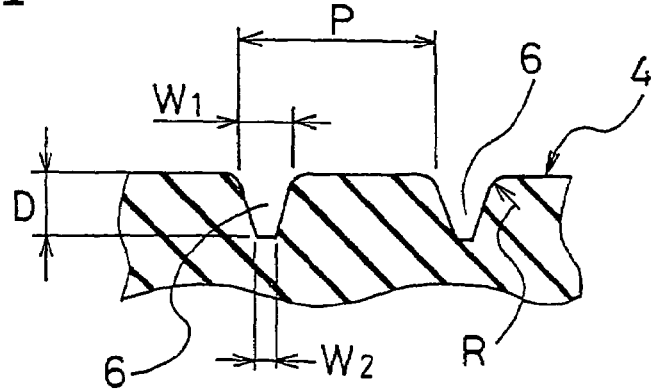
FIG. 4 is a cross-sectional view of the block, showing a modification of the fine grooves.

Besides the above-mentioned configuration in which the edges of the fine grooves 6 are formed into a curved shape so that the opening of the fine groove 6 is substantially wider than the bottom thereof, the sidewalls of the fine grooves 6 may be tilted relative to the diametral direction of the tire so that the width $W_1$ of the opening of the fine groove 6 is greater than the width $W_2$ of the bottom thereof as shown in FIG. 4. In this case, the edges of the fine grooves 6 may be formed into a curved shape. Thus, it becomes easy to take snow in the fine grooves 6 and thus to ensure a sufficient contact area during running on ice-bound roads. Further, it becomes possible to facilitate drainage of snow from the fine grooves 6 and thus to prevent snow clogging.

When the fine grooves 6 do not have a specific edge in a longitudinal section thereof, the width $W_1$ of the opening of the fine groove 6 is measured with respect to the intersection of the extension line of the sidewall of the groove and the extension line of the tread surface, and the width $W_2$ of the bottom of the fine groove 6 is measured with respect to the intersection of the extension line of the sidewall of the groove and the extension line of the bottom surface of the groove.

In the above-described pneumatic tire for ice-bound or snow-covered roads, the angle θ of the fine groove 6 with the circumferential direction of the tire is not particularly limited, but preferably the angle θ is set to lie between 42 and 60 degrees inclusive. The direction of inclination of the fine groove 6 relative to the circumferential direction of the tire is not particularly limited, and the fine groove. 6 may be inclined in a lower right or lower left direction as shown in FIG. 1. By limiting the angle θ of the fine groove 6 as mentioned above, the fine grooves 6 effectively remove a water film developing between an ice-bound road surface and the tread surface during running, and the fine grooves 6 effectively eliminate snow on the tread surface by the centrifugal force taking place during the rotation of the tire. Moreover, the fine grooves 6 can fully exert the effect of the edges thereof at the time of braking or driving. Therefore, the pneumatic tire can exert excellent brake and drive performance on ice-bound roads in early periods of wear before the fine grooves 6 wear away.

When the angle θ of the fine groove 6 with the circumferential direction of the tire is less than 42 degrees, the edges of the fine grooves 6 do not contribute to braking or driving, and moreover, much time is required before the fine grooves 6 wear away so that the tire exerts properties intrinsic to the tread rubber. When the angle θ of the fine groove 6 with the circumferential direction of the tire exceeds 60 degrees, the tire has an inadequate effect of removing a water film on ice-bound roads and also has difficulty in removing snow on the tread surface.

Figure 5:
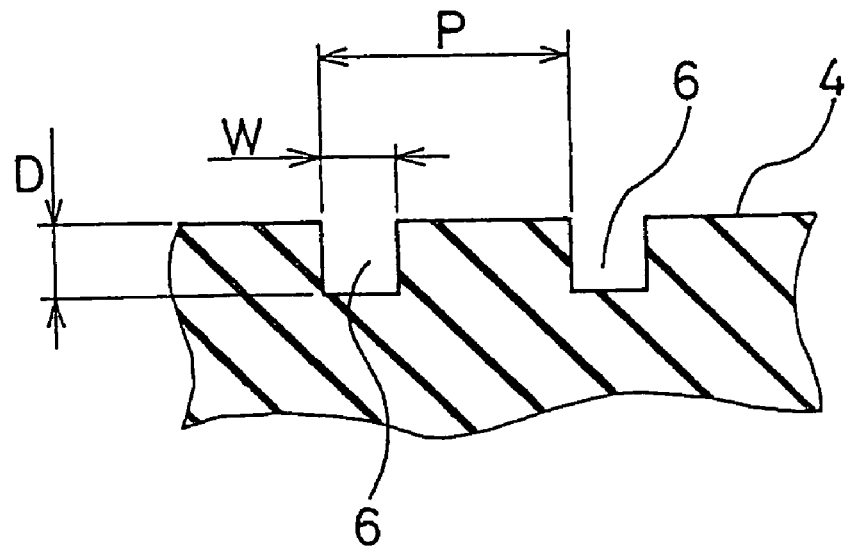
FIG. 5 is a cross-sectional view of the block, showing another modification of the fine grooves.

When the angle θ of the fine groove 6 is limited to within the above-mentioned range, the sectional shape of the fine groove 6 is not particularly limited, and the fine groove 6 may have a section in a rectangular shape as shown in FIG. 5. When the edges of the fine grooves 6 are formed into a curved shape with the curvature radius R as shown in FIG. 3, or when the width $W_1$ of the opening of the fine groove 6 is greater than the width $W_2$ of the bottom thereof as shown in FIG. 4, the brake and drive performance on ice-bound roads, of course, can be further improved.

In the above-described pneumatic tire for ice-bound or snow-covered roads, it is desirable that the depth D of the fine groove 6 lie between 0.1 and 0.8 mm inclusive, the width W of the fine groove 6 lie between 0.1 and 0.8 mm inclusive, and the pitch P of the fine grooves 6 lie between 0.5 and 2.0 mm inclusive.

The fine groove 6 having a depth D of less than 0.1 mm leads to degradation in the brake and drive performance on ice-bound roads, because the fine groove 6 is deficient in the effect of removing a water film and the capability of eliminating snow. Since the properties intrinsic to the tread rubber are exerted after the tread surface has been worn by at least 0.1 mm or more, the fine grooves 6 must remain until the tread surface reaches such a worn state. The fine groove 6 having a depth D of more than 0.8 mm leads to degradation in the brake and drive performance on ice-bound roads because the fine groove 6 reduces tread stiffness, although the fine groove 6 increases the effect of removing a water film and the capability of eliminating snow.

The fine groove 6 having a width W of less than 0.1 mm leads to degradation in the brake and drive performance on ice-bound roads, because the fine groove 6 is deficient in the effect of removing a water film and the capability of eliminating snow. The fine groove 6 having a width W of more than 0.8 mm leads to degradation in the brake and drive performance on ice-bound roads because the fine groove 6 causes an excessive reduction in the area of contact with a road surface, although the fine groove 6 is excellent in the effect of removing a water film and the capability of eliminating snow.

When the pitch P of the fine grooves 6 is less than 0.5 mm, this allows the speeding up of the wearing away of the fine grooves 6. However, the fine grooves 6 is crushed at the time of braking or driving due to the insufficient tread stiffness, resulting in deficiencies in the effect of removing a water film and the capability of eliminating snow. When the pitch P of the fine grooves 6 exceeds 2.0 mm, this causes a slow wearing away of the fine grooves 6. Moreover, this configuration leads to a reduction in the area of the fine grooves 6 and thus to deficiencies in the effect of removing a water film and the capability of eliminating snow.

Figure 6:
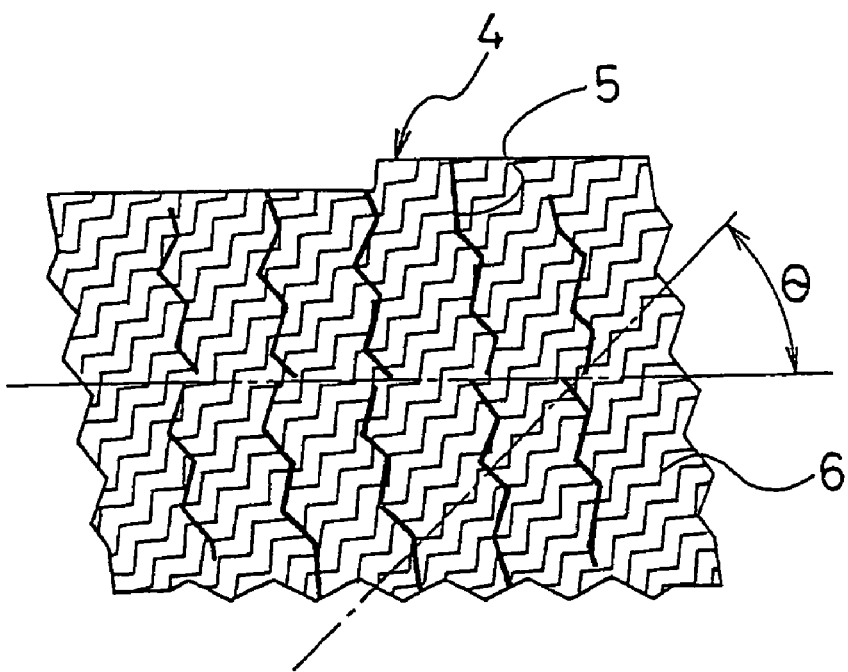
FIG. 6 is a plan view of the block, showing still another modification of the fine grooves.

In the above-described pneumatic tire for ice-bound or snow-covered roads, the geometry of the fine groove 6 in a plan view, is not particularly limited, and may be a zigzag form as shown in FIG. 6 or a corrugated one, besides being a linear form as shown in FIG. 2. Incidentally, the angle of the fine groove in the zigzag or corrugated form with the circumferential direction of the tire is set with respect to the center line of the amplitude of the fine groove.

In the above-mentioned embodiment, the description has been given with regard to the pneumatic tire for ice-bound or snow-covered roads having the block pattern. However, the invention may be applied to a pneumatic tire for ice-bound or snow-covered roads, which includes tread partitioned into lands formed of ribs extending in the circumferential direction of the tire.

EMBODIMENTS

Pneumatic tires for ice-bound or snow-covered roads, which are of a tire size 195/65R15 and have a block pattern, were made as the prior art 1 and embodiments 1 to 3. In each tire, a plurality of fine grooves shallower than sipes were formed in a tread surface of each block. The pitch P of the fine grooves, the depth D of the fine groove, the width $W_1$ of the fine groove (the width of the opening), the width $W_2$ of the fine groove (the width of the bottom), and the curvature radius R of the edge of the fine groove were set as shown in Table 1.

The brake performance on ice was evaluated for each of these test tires according to the following test method. The results of evaluation are shown in Table 1 together.

Brake Performance on Ice

The tire above with a condition of a rim size of 15×6.5 JJ and an air pressure of 200 kPa was fitted to a rear-wheel-drive vehicle equipped with an antilock braking system (ABS) and having an engine displacement of 2500 cm³. When ABS-based braking was performed in a situation where the vehicle is running on ice at a speed of 40 km per hour, the braking distance was measured. The results of evaluation are expressed as indices relative to 100, using the reciprocals of the measured values, provided that the performance of the prior art 1 is defined as 100. A larger index value indicates a shorter braking distance.

TABLE 1

|  | Prior art 1 | Embodiment 1 | Embodiment 2 | Embodiment 3 |
| --- | --- | --- | --- | --- |
| Pitch P of fine grooves (mm) | 1.0 | 1.0 | 2.0 | 1.0 |
| Depth D of fine groove (mm) | 0.3 | 0.3 | 0.3 | 0.3 |
| Width $W_1$ of fine groove (mm) | 0.3 | 0.3 | 0.3 | 0.3 |
| Width $W_2$ of fine groove (mm) | 0.3 | 0.3 | 0.3 | 0.15 |
| Curvature radius R (mm) | — | 0.1 | 0.1 | 0.1 |
| Brake performance on ice | 100 | 108 | 104 | 110 |

As can be seen from Table 1, all the embodiments 1 to 3 are superior to the prior art 1 in brake performance on ice in the ABS-based braking.

Figure 7:
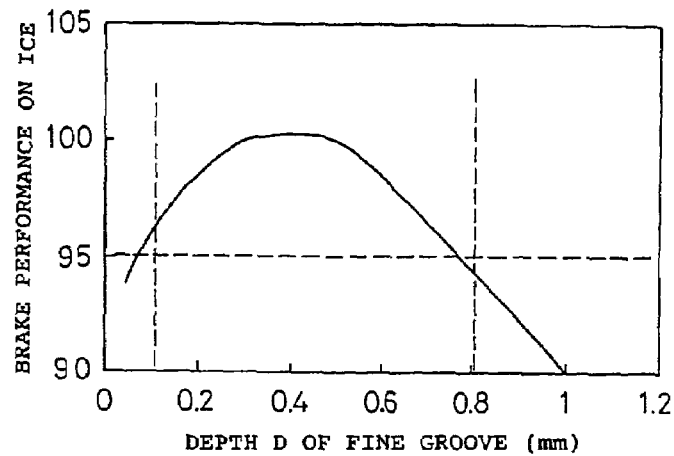
FIG. 7 is a plot showing the relationship between the depth D of the fine groove and the brake performance on ice when the edges of the fine grooves are formed into a curved shape.

Next, pneumatic tires for ice-bound or snow-covered roads, which are of a tire size 195/65R15 and have a block pattern, were made in the following manner. In each tire, a plurality of fine grooves shallower than sipes were formed in a tread surface of each block, and the edges of the fine grooves were formed into a curved shape (R=0.1 mm). The width W of the fine groove was set to 0.3 mm, the pitch P of the fine grooves was set to 1.0 mm, and only the depth D of the fine groove was varied. The brake performance on ice was evaluated for each tire according to the above-mentioned test method. The results of evaluation are shown in FIG. 7. Incidentally, the results of evaluation are expressed as indices relative to 100, provided that the brake performance on ice when D=0.3 mm is defined as 100. From FIG. 7, it can be seen that excellent brake performance on ice can be achieved when the depth D of the fine groove lies between 0.1 and 0.8 mm inclusive.

Figure 8:
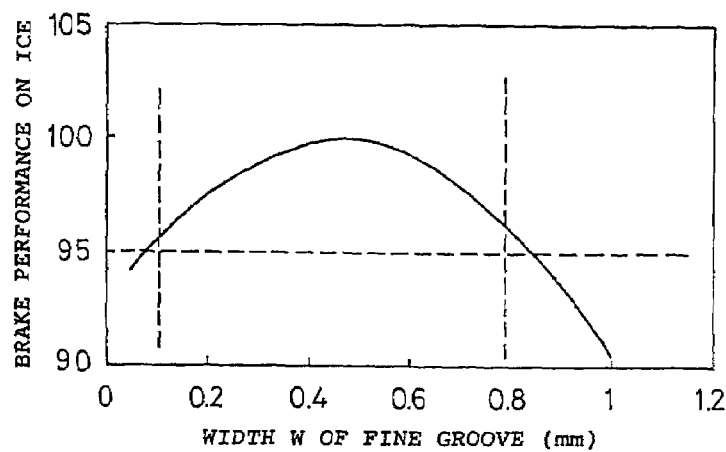
FIG. 8 is a plot showing the relationship between the width W of the fine groove and the brake performance on ice when the edges of the fine grooves are formed into a curved shape.

Next, pneumatic tires for ice-bound or snow-covered roads, which are of a tire size 195/65R15 and have a block pattern, were made in the following manner. In each tire, a plurality of fine grooves shallower than sipes were formed in a tread surface of each block, and the edges of the fine grooves were formed into a curved shape (R=0.1 mm). The depth D of the fine groove was set to 0.3 mm, the pitch P of the fine grooves was set to 1.0 mm, and only the width W of the fine groove was varied. The brake performance on ice was evaluated for each tire according to the above-mentioned test method. The results of evaluation are shown in FIG. 8. Incidentally, the results of evaluation are expressed as indices relative to 100, provided that the brake performance on ice is defined as 100 when W=0.5 mm. From FIG. 8, it can be seen that excellent brake performance on ice can be achieved when the width W of the fine groove lies between 0.1 and 0.8 mm inclusive.

Figure 9:
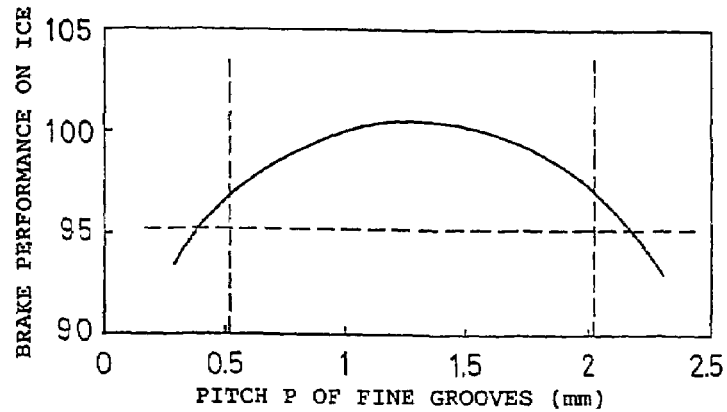
FIG. 9 is a plot showing the relationship between the pitch P of the fine grooves and the brake performance on ice when the edges of the fine grooves are formed into a curved shape.

Next, pneumatic tires for ice-bound or snow-covered roads, which are of a tire size 195/65R15 and have a block pattern, were made in the following manner. In each tire, a plurality of fine grooves shallower than sipes were formed in a tread surface of each block, and the edges of the fine grooves were formed into a curved shape (R=0.1 mm). The depth D of the fine groove was set to 0.3 mm, the width W of the fine groove was set to 0.3 mm, and only the pitch P of the fine grooves was varied. The brake performance on ice was evaluated for each tire according to the above-mentioned test method. The results of evaluation are shown in FIG. 9. Incidentally, the results of evaluation are expressed as indices relative to 100, provided that the brake performance on ice is defined as 100 when P=1.0 mm. From FIG. 9, it can be seen that excellent brake performance on ice can be achieved when the pitch P of the fine grooves lies between 0.5 and 2.0 mm inclusive.

Next, pneumatic tires for ice-bound or snow-covered roads, which are of a tire size 195/65R15 and have a block pattern, were made as the prior art 11, comparative examples 11 and 12, and embodiments 11 to 14. In each tire, a plurality of fine grooves shallower than sipes were formed in a tread surface of each block. The angle $\theta$ of the fine groove with the circumferential direction of the tire, the geometry of the fine groove in a plan view, the width W of the fine groove, the pitch P of the fine grooves, and the depth D of the fine groove were set as shown in Table 2.

The brake performance on ice and rapid wear characteristics were evaluated for each tire according to the above-mentioned test method. The results of evaluation are shown in Table 2 together.

Brake Performance on Ice

The tire above with a condition of a rim size of 15×6.5 JJ and an air pressure of 200 kPa was fitted to a rear-wheel-drive vehicle equipped with an antilock braking system (ABS) and having an engine displacement of 2500 $cm^3$. When ABS-based braking was performed in a situation where the vehicle is running on ice at a speed of 40 km per hour, the braking distance was measured for each test tire. The results of evaluation are expressed as indices relative to 100, using the reciprocals of the measured values, provided that the performance of the prior art 11 is defined as 100. A larger index value indicates a shorter braking distance.

Initial Wear Characteristics

The tire above with a condition of a rim size of 15×6.5 JJ and an air pressure of 200 kPa was fitted to the vehicle. When the vehicle was running at an average speed of 35 km per hour on a test course which is an imitation of general roads, the amount of the fine grooves remaining was measured for every 100 km, and the mileage which was accumulated before the fine grooves wear away was measured. The results of evaluation are expressed as indices relative to 100, using the reciprocals of the measured values, provided that the results of the prior art 11 are defined as 100. A larger index value indicates a rapider wearing away of the fine grooves.

TABLE 2

|  | Prior art 11 | Comparative example 11 | Embodiment 11 | Embodiment 12 | Embodiment 13 | Comparative example 12 | Embodiment 14 |
| --- | --- | --- | --- | --- | --- | --- | --- |
| Angle θ of fine groove (degree) | 0 | 40 | 42 | 45 | 60 | 65 | 45 |
| Geometry of fine groove | Linear | Linear | Linear | Linear | Linear | Linear | Zigzag |
| Width W of fine groove (mm) | 0.3 | 0.3 | 0.3 | 0.3 | 0.3 | 0.3 | 0.3 |
| Pitch P of fine grooves (mm) | 1.0 | 1.0 | 1.0 | 1.0 | 1.0 | 1.0 | 1.0 |
| Depth D of fine groove (mm) | 0.3 | 0.3 | 0.3 | 0.3 | 0.3 | 0.3 | 0.3 |
| Brake performance on ice | 100 | 104 | 110 | 112 | 111 | 108 | 117 |
| Rapid wear characteristics | 100 | 105 | 110 | 111 | 114 | 116 | 115 |

As can be seen from Table 2, all the embodiments 11 to 14 are superior in brake performance on ice to the prior art 11. Moreover, the embodiments 11 to 14 could earlier exert properties intrinsic to tread rubber because the fine grooves thereof wore away more rapidly. The comparative examples 11 and 12 had an inadequate effect of improving the brake performance on ice.

Figure 10:
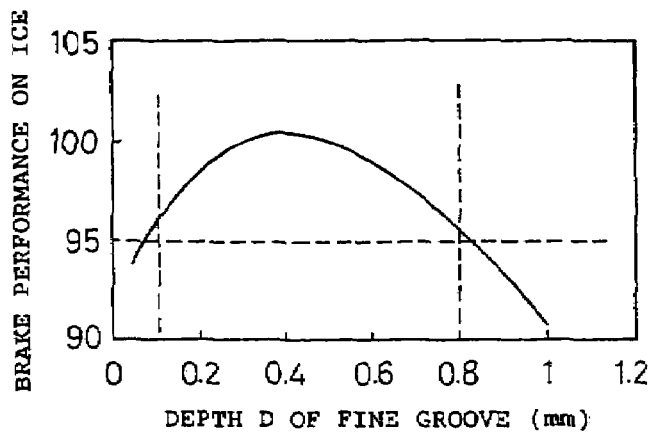
FIG. 10 is a plot showing the relationship between the depth D of the fine grooves and the brake performance on ice when the fine grooves are inclined at a predetermined angle.

Next, pneumatic tires for ice-bound or snow-covered roads, which are of a tire size 195/65R15 and have a block pattern, was made in the following manner. In each tire, a plurality of fine grooves shallower than sipes were formed in a tread surface of each block. The angle θ of the fine groove with the circumferential direction of the tire was set to 45 degrees, the width W of the fine groove was set to 0.3 mm, the pitch P of the fine grooves was set to 1.0 mm, and only the depth D of the fine groove was varied. The brake performance on ice was evaluated for each tire according to the above-mentioned test method. The results of evaluation are shown in FIG. 10. Incidentally, the results of evaluation are expressed as indices relative to 100, provided that the brake performance on ice is defined as 100 when D=0.3 mm. From FIG. 10, it can be seen that excellent brake performance on ice can be achieved when the depth D of the fine groove lies between 0.1 and 0.8 mm inclusive.

Figure 11:
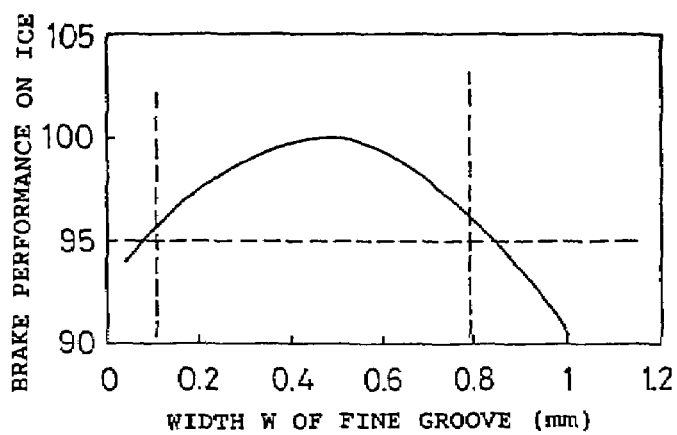
FIG. 11 is a plot showing the relationship between the width W of the fine grooves and the brake performance on ice when the fine grooves are inclined at a predetermined angle.

Next, pneumatic tires for ice-bound or snow-covered roads, which are of a tire size 195/65R15 and have a block pattern, were made in the following manner. In each tire, a plurality of fine grooves shallower than sipes were formed in a tread surface of each block. The angle θ of the fine groove with the circumferential direction of the tire was set to 45 degrees, the depth D of the fine groove was set to 0.3 mm, the pitch P of the fine grooves was set to 1.0 mm, and only the width W of the fine groove was varied. The brake performance on ice was evaluated for each tire according to the above-mentioned test method. The results of evaluation are shown in FIG. 11. Incidentally, the results of evaluation are expressed as indices relative to 100, provided that the brake performance on ice is defined as 100 when W=0.5 mm. From FIG. 11, it can be seen that excellent brake performance on ice can be achieved when the width W of the fine groove lies between 0.1 and 0.8 mm inclusive.

Figure 12:
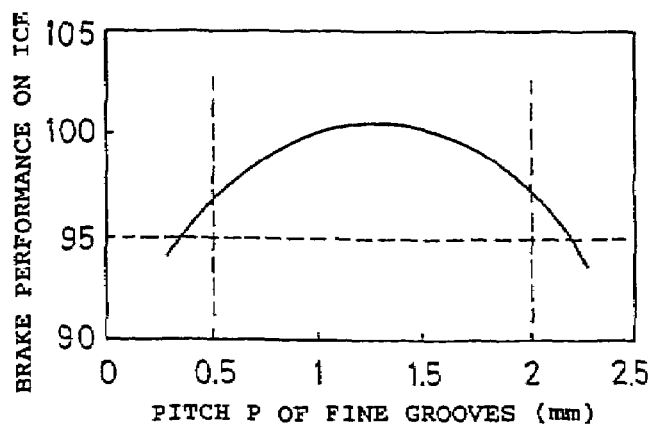
FIG. 12 is a plot showing the relationship between the pitch P of the fine grooves and the brake performance on ice when the fine grooves are inclined at a predetermined angle.

Next, pneumatic tires for ice-bound or snow-covered roads, which are of a tire size 195/65R15 and have a block pattern, were made in the following manner. In each tire, a plurality of fine grooves shallower than sipes were formed in a tread surface of each block. The angle θ of the fine groove with the circumferential direction of the tire was set to 45 degrees, the depth D of the fine groove was set to 0.3 mm, the width W of the fine groove was set to 0.3 mm, and only the pitch P of the fine grooves was varied. The brake performance on ice was evaluated for each tire according to the above-mentioned test method. The results of evaluation are shown in FIG. 12. Incidentally, the results of evaluation are expressed as indices relative to 100, provided that the brake performance on ice is defined as 100 when P=1.0 mm. From FIG. 12, it can be seen that excellent brake performance on ice can be achieved when the pitch P of the fine grooves lies between 0.5 and 2.0 mm inclusive.

INDUSTRIAL APPLICABILITY

According to the invention, a pneumatic tire for ice-bound or snow-covered roads includes tread partitioned into a plurality of lands formed of blocks or ribs, each land having a plurality of sipes formed therein, wherein a plurality of fine grooves shallower than the sipes are formed in a tread surface of the land, and the shape of the fine groove is specified. Thus, when the fine grooves are used to improve the brake and drive performance on ice-bound roads in early periods of wear, it becomes possible to prevent snow clogging in the fine grooves, thus enabling a further enhancement of the effect of improving the brake and drive performance. Furthermore, the brake and drive performance on ice-bound roads in early periods of wear can be improved, and the properties intrinsic to the tread rubber are exerted by causing the fine grooves to wear away early. Accordingly, the pneumatic tire for ice-bound or snow-covered roads of the invention enables even automobiles, which are equipped with the antilock braking system, to exert excellent brake performance on ice-bound roads.

While the preferred embodiments of the invention have been described in detail above, it is to be understood that various modifications, substitutions and replacements thereof may be made without departing from the spirit and scope of the invention as defined in the appended claims.

What is claimed is:

1. A pneumatic tire for ice-bound or snow-covered roads, comprising:
   a tread of a block pattern including land portions each comprising a plurality of blocks partitioned by a plurality of main grooves extending in a circumferential direction of the tire and a plurality of lateral grooves extending in a width direction of the tire,
   each block being formed with a plurality of sipes extending in the width direction of the tire in a zigzag form in a plan view of the tread,
   wherein a plurality of fine grooves shallower than the sipes are formed in a tread surface of the land, and the angle of the fine grooves with the circumferential direction of the tire lies between 42 and 55 degrees inclusive,
   wherein the plurality of blocks form a plurality of block rows each comprising a plurality of blocks arranged in a row in the circumferential direction of the tire, with each block having all of the fine grooves inclined in only one direction,
   the angle of the fine grooves with the circumferential direction of the tire in at least one of the plurality of block rows being opposite to the direction of the angle of the fine grooves with the circumferential direction of the tire in each neighboring block rows,
   wherein the depth of the fine groove lies between 0.1 and 0.8 mm inclusive,
   wherein the width of the fine groove lies between 0.1 and 0.8 mm inclusive, and
   wherein the pitch of the fine groove lies between 0.5 and 2.0 mm inclusive.

2. A pneumatic tire for ice-bound or snow-covered roads according to claim 1, wherein the edges of the fine grooves are formed into a curved shape.

3. A pneumatic tire for ice-bound or snow-covered roads according to claim 1, wherein the width of an opening of the fine groove is greater than the width of a bottom thereof.

4. A pneumatic tire for ice-bound or snow-covered roads according to claim 1, wherein the fine grooves are in a zigzag form or corrugated form in plan view.

5. A pneumatic tire for ice-bound or snow-covered roads according to claim 1, wherein the angle of the fine grooves with the circumferential direction of the tires lies between 42 and 45 degrees inclusive.

* * * * *